US009757853B2

(12) United States Patent
Su

(10) Patent No.: US 9,757,853 B2
(45) Date of Patent: Sep. 12, 2017

(54) MAGNETIC TOOL HOLDER

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

( * ) Notice: Subject to any disclaimer, the term of this patent is extended or adjusted under 35 U.S.C. 154(b) by 190 days.

(21) Appl. No.: 14/715,722

(22) Filed: May 19, 2015

(65) Prior Publication Data
US 2016/0031074 A1 Feb. 4, 2016

(30) Foreign Application Priority Data

Jul. 31, 2014 (TW) .............. 103126150 A

(51) Int. Cl.
| B25H 3/04 | (2006.01) |
| B25H 3/00 | (2006.01) |
| F16B 1/00 | (2006.01) |
| A47F 7/00 | (2006.01) |
| A47F 5/00 | (2006.01) |

(52) U.S. Cl.
CPC .............. B25H 3/04 (2013.01); B25H 3/003 (2013.01); A47F 5/00 (2013.01); A47F 7/00 (2013.01); F16B 2001/0035 (2013.01)

(58) Field of Classification Search
CPC .... A47F 7/00; A47F 5/00; B25H 3/00; B25H 3/003; B25H 3/04; B25H 3/06; F16B 1/00; F16B 2001/003; F16B 2001/0035
USPC .......... 206/349, 350, 378, 379; 211/70.6, 89
See application file for complete search history.

(56) References Cited

U.S. PATENT DOCUMENTS

| 5,715,951 A * | 2/1998 | Dembicks ................ B25H 3/06 206/378 |
| 5,992,626 A * | 11/1999 | Anderson .............. B25H 3/003 206/378 |
| 6,250,466 B1 | 6/2001 | Ernst |
| 6,431,373 B1 * | 8/2002 | Blick ..................... B25H 3/003 206/378 |
| 6,571,966 B1 | 6/2003 | Hsiao |
| 7,798,336 B2 | 9/2010 | Shiao |
| 7,841,480 B2 * | 11/2010 | Hsieh ...................... B25H 3/06 206/378 |
| 9,186,790 B1 * | 11/2015 | Kao ......................... B25H 3/06 |
| 9,545,716 B2 * | 1/2017 | Hsieh ...................... B25H 3/04 |

FOREIGN PATENT DOCUMENTS

| CN | 2774716 Y | 4/2006 |
| TW | 262795 | 11/1995 |
| TW | 396937 U | 7/2000 |
| TW | 479608 U | 3/2002 |

(Continued)

Primary Examiner — Bryon Gehman
(74) Attorney, Agent, or Firm — Alan D. Kamrath; Kamrath IP Lawfirm, P.A.

(57) ABSTRACT

A tool holder includes a rack and at least one seat connected to the rack. The seat includes an assembling portion and an attached portion spaced from the assembling portion. The assembling portion is detachably mounted to the rack. The attached portion includes an abutted face and a recess. The abutted face is located opposite to the rack. The recess is located between the abutted face and the assembling portion. The recess receives a magnet adapted to magnetically attach to a metal object.

15 Claims, 6 Drawing Sheets

(56) References Cited

FOREIGN PATENT DOCUMENTS

| TW | 510288 | U | 11/2002 |
|----|--------|---|---------|
| TW | 576303 | U | 2/2004 |
| TW | M374949 | U | 3/2010 |
| TW | I342824 | B | 6/2011 |
| TW | I350238 | B | 10/2011 |

\* cited by examiner

MAGNETIC TOOL HOLDER

BACKGROUND

The present invention relates to a tool holder and, in particular, to a tool holder on which may be stored and supported a plurality of sockets.

U.S. Pat. No. 6,250,466 discloses a rail provided with a hand grip at one end. Drive sockets are stored on rail mounted carriers each including a base on the rail, the number of which may be altered to carry a set of drive sockets for use with a ratchet or socket wrench supported by the rail. The drive socket carriers engage a recess in an internal socket wall.

However, the hand grip must be gripped by one hand, and then the drive sockets are removed from the drive socket carriers by the other hand. This is inconvenient for a user who has to use both hands to work at the same time.

Thus, a need exists for a novel tool holder with easily recognizable size indicia to mitigate and/or obviate the above disadvantages.

BRIEF SUMMARY

A tool holder according to the present invention includes a rack and at least one seat. The seat is connected to the rack. The seat includes an assembling portion and an attached portion spaced from the assembling portion. The assembling portion is detachably mounted to the rack. The attached portion includes an abutted face and a recess. The abutted face is located opposite to the rack. The recess is located between the abutted face and the assembling portion, and the recess receives a magnet.

The assembling portion includes a slot engaged with the rack.

The rack includes a rail extending along an axis. The rail includes a body and at least one hole formed on the body. The assembling portion includes a protrusion formed in the slot and engaged into the hole of the rail.

The assembling portion includes a guiding face formed on an end of the protrusion. A tilted angle is formed between the guiding face and the axis, and the tilted angle is less than 10 degrees.

An extending direction of the recess is parallel to the abutted face.

The recess has an opening disposed at a side thereof to be adapted to receive the magnet.

The rack includes a plurality of clips. Each clip is detachably mounted on the rail along the axis. Each clip includes a head formed opposite to the rail. The head of each clip has resiliency and is shaped and sized to be able to receive a socket.

The rail includes a pair of wing portions extending sideways from the body, and each clip includes a pair of wings extending sideways from the head. The pair of wings of each clip is engaged with the pair of wing portions of the rail.

The rail is made of one single piece from a metal sheet, and each clip is made of one single piece from a metal sheet.

The rail has a substantially U-shaped cross-section perpendicular to the axis, and with each clip has a substantially U-shaped cross-section perpendicular to the axis.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
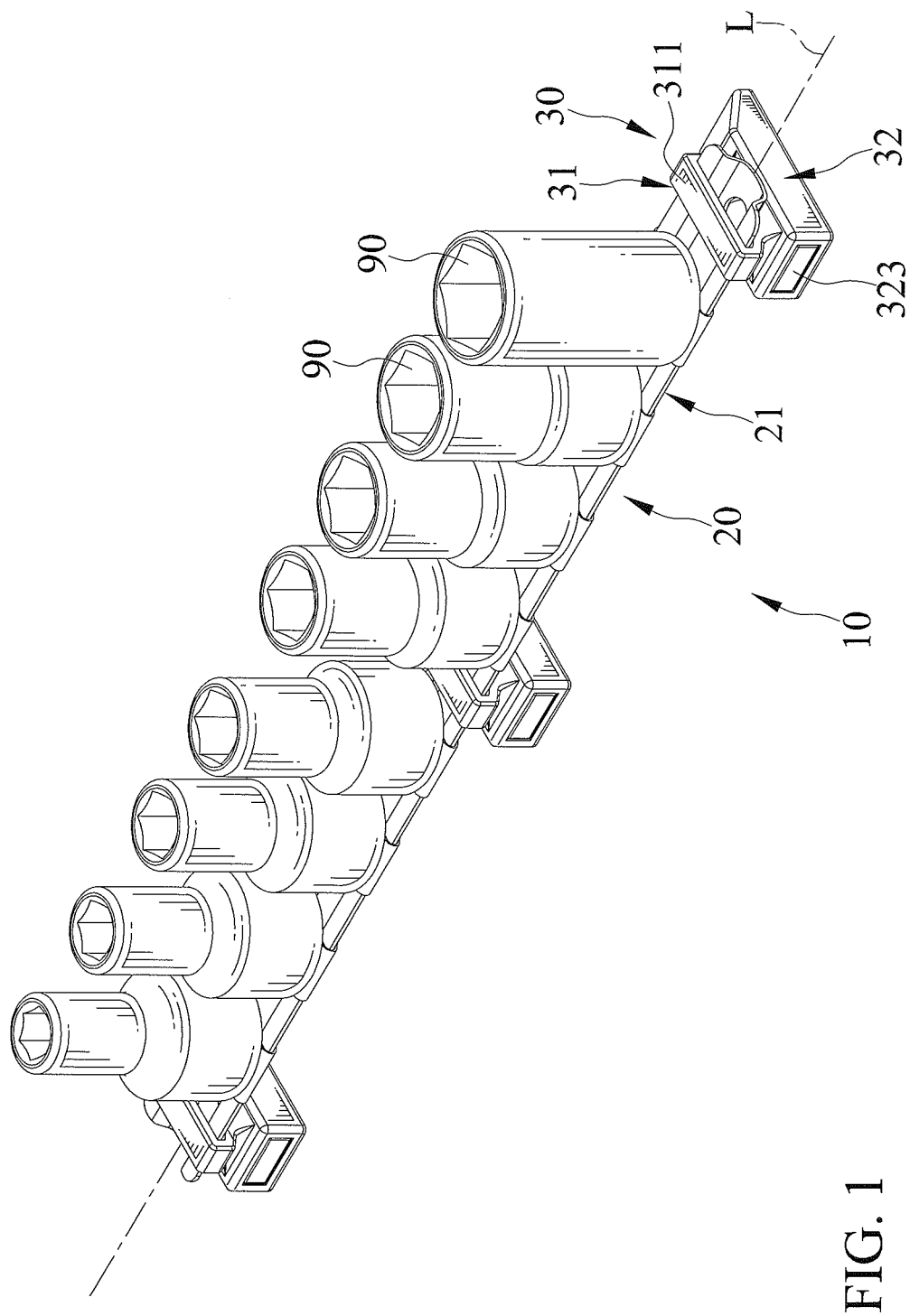
FIG. 1 is a perspective view of a tool holder of a first embodiment according to the present invention.
Figure 2:
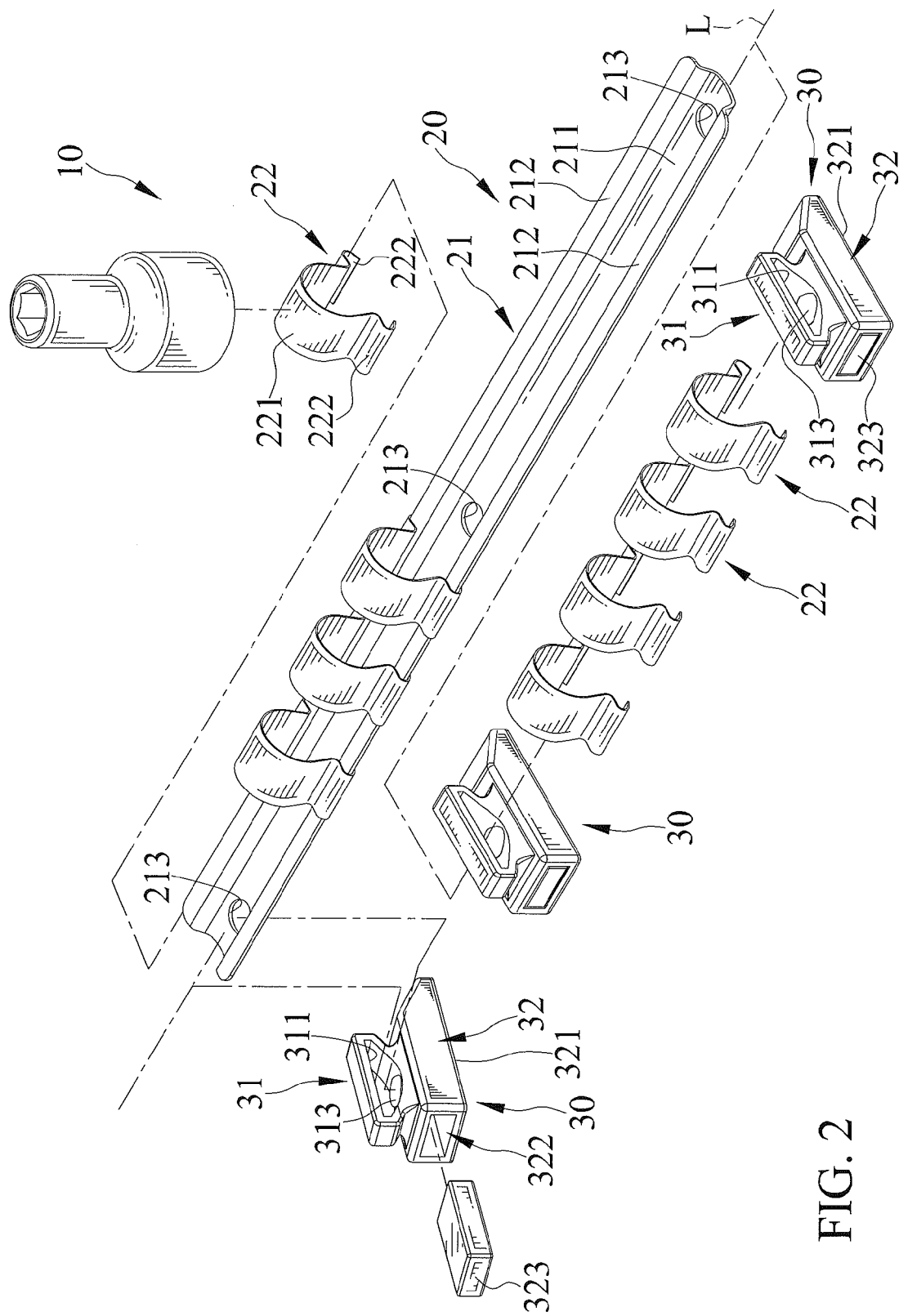
FIG. 2 is an exploded, perspective view of the tool holder of FIG. 1.
Figure 3:
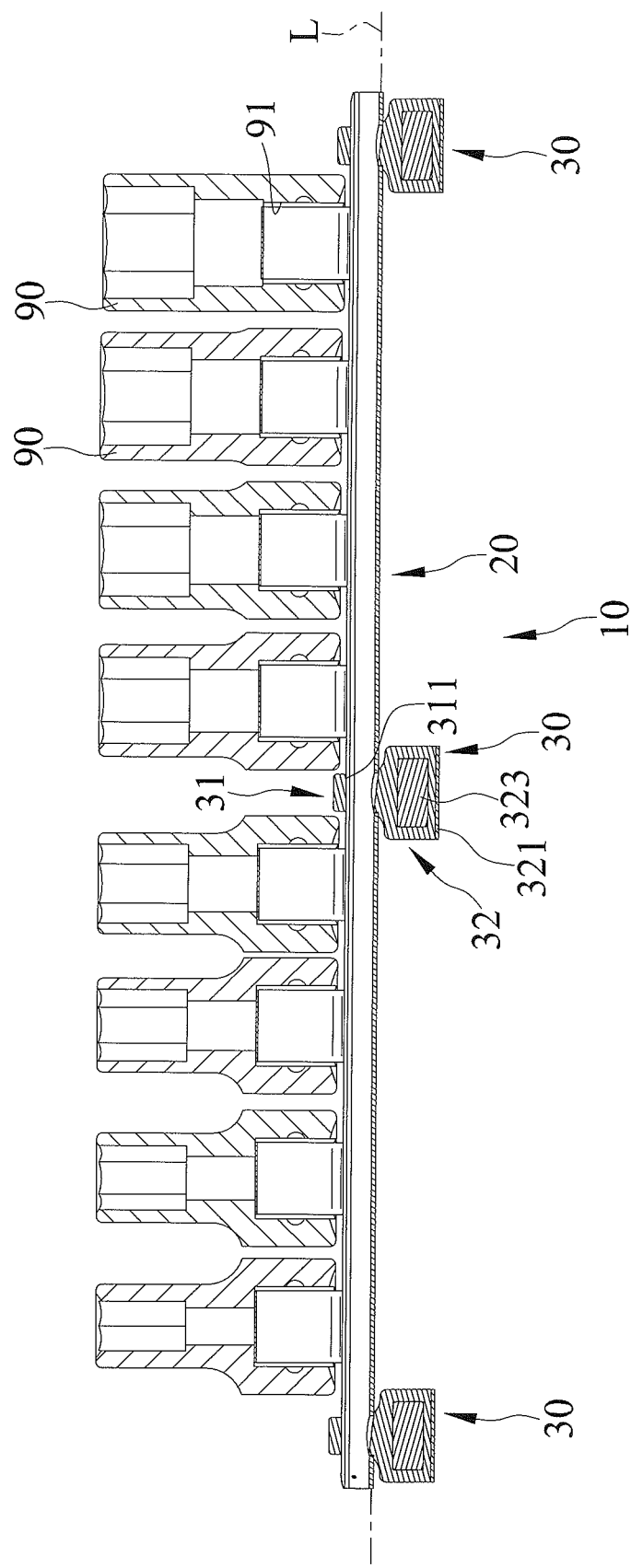
FIG. 3 is a cross-sectional view of the tool holder of FIG. 1.
Figure 4:
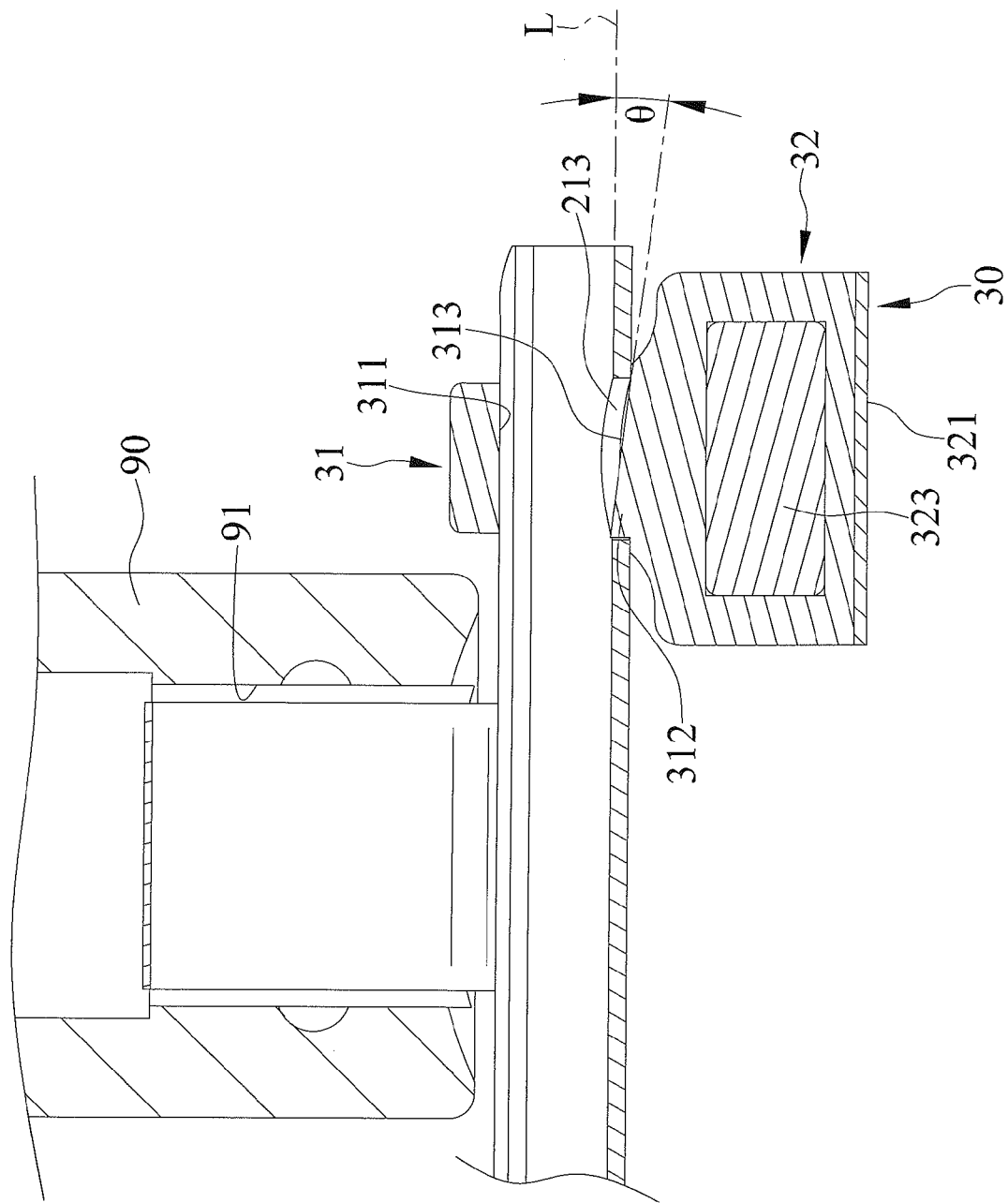
FIG. 4 is a partial, enlarged view of the tool holder of FIG. 3.
Figure 5:
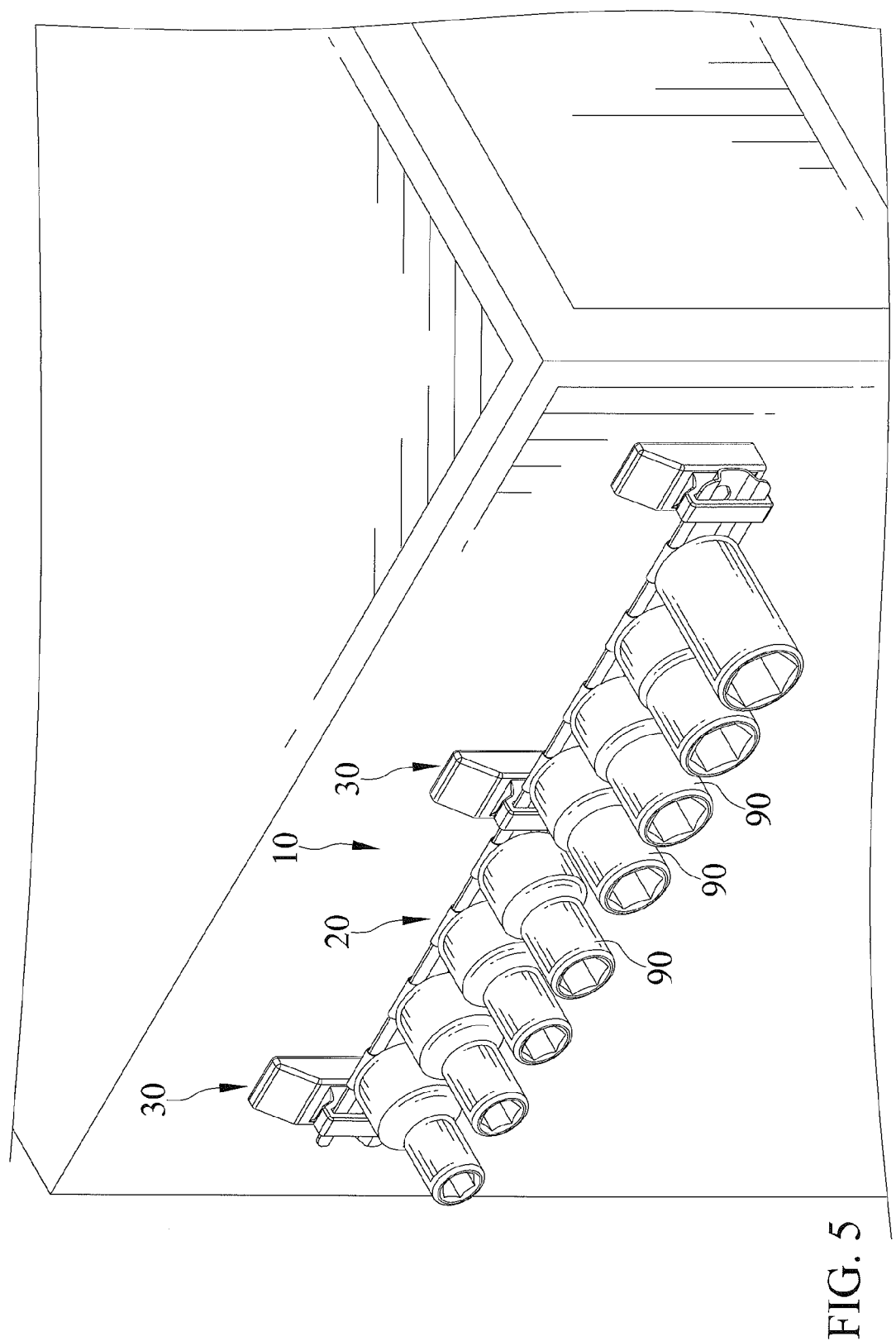
FIG. 5 is a perspective view of the tool holder of FIG. 1 and illustrates the tool holder attached to a metal cabinet.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "side", "end", "portion", "spacing", and similar terms are used herein, it should be understood that these terms have reference only to the structure shown in the drawings as it would appear to a person viewing the drawings and are utilized only to facilitate describing the illustrative embodiments.

DETAILED DESCRIPTION

FIGS. 1-5 show a tool holder 10 of a first embodiment according to the present invention. The tool holder 10 includes a rack 20 and at least one seat 30.

The rack 20 includes a rail 21 and a plurality of clips 22. The rail 21 extends along an axis L. The rail 21 includes a body 211, a pair of wing portions 212 extending sideways from the body 211, and at least one hole 213 formed on the body 211. The rail 21 is preferably made of one single piece, such as by a pressing or punching operation, from a metal sheet and has a substantially U-shaped cross-section perpendicular to the axis L. In this embodiment, the rail 21 includes three holes 213.

Each clip 22 is detachably mounted on the rail 21 along the axis L. Each clip 22 includes a head 221 formed opposite to the rail 21, and a pair of wings 222 extending sideways from the head 221. The head 221 of each clip 22 has resiliency and is shaped and sized in such a manner that a socket 90 with an engaging hole 91 of a smaller diameter than a width of the head 221 can be placed on the head 221 of each clip 22 firmly. The pair of wings 222 extends sideways from the head 221. The pair of wings 222 of each clip 22 is engaged with the pair of wing portions 212 of the rail 21, so that each clip 22 is slidable on the rail 21. Each clip 22 is preferably formed integrally from a single sheet of metal and has a substantially U-shaped cross-section perpendicular to the axis L.

The at least one seat 30 is connected to the rack 20. In this embodiment, the tool holder 10 includes three seats 30 respectively located at both sides and the middle thereof. The seat 30 includes an assembling portion 31 and an attached portion 32 spaced from the assembling portion 31. The assembling portion 31 is detachably mounted to the rack 20.

The assembling portion 31 includes a slot 311 and a protrusion 312 formed in a bottom of the slot 311. The slot 311 is engaged with the rack 20, and the protrusion 312 of the seat 30 is engaged into the hole 213 of the rail 21 to prevent the plurality of seats 30 from being involuntary moved relative to the rack 20. In a preferred form, the assembling portion 31 further includes a guiding face 313 formed on an end of the protrusion 312, and a tilted angle θ is formed between the guiding face 313 and the axis L. The tilted angle θ is preferably less than 10 degrees to facilitate the protrusion 312 of the seat 30 to accurately engage into the hole 213 of the rail 21.

The attached portion 32 includes an abutted face 321 and a recess 322. The abutted face 321 is located opposite to the rack 20. The recess 322 is located between the abutted face 321 and the assembling portion 31. The recess 322 receives a magnet 323 adapted to magnetically attach to a metal cabinet (shown in FIG. 5), thereby releasably retaining the tool holder 10 to the metal cabinet. Therefore, the tool holder 10 can be releasably attached to a metal object by the magnetic force, so that a user can take out the socket 90 from the tool holder 10 by one hand for use. In a preferred form, the recess 322 has an opening disposed at a side thereof, so that the magnet 323 is mounted into the recess 322 via the opening, preventing the magnetic force between the magnet 323 and the metal cabinet being too strong. Additionally, an extending direction of the recess 322 is parallel to the abutted face 321, so that the tool holder 10 can be firmly attached to the metal cabinet.

Figure 6:
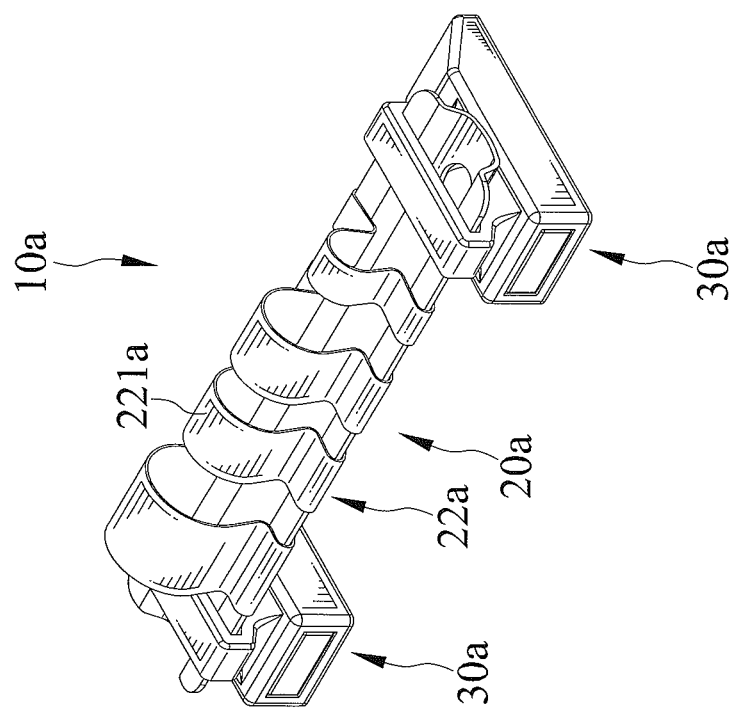
FIG. 6 is a perspective view of a tool holder of a second embodiment according to the present invention.

FIG. 6 shows a tool holder 10a in accordance with a second embodiment of the present invention. The second embodiment is generally similar to the first embodiment except that the head 221a of each clip 22a having a different width may be required in order to receive different sockets of variable engaging hole size. In this embodiment, the tool holder 10a includes two seats 30a respectively located at two opposite sides of the rack 20a.

Although specific embodiments have been illustrated and described, numerous modifications and variations are still possible without departing from the scope of the invention. The scope of the invention is limited by the accompanying claims.

The invention claimed is:

1. A tool holder comprising:
a magnet;
a rack extending along an axis; and
at least one seat connected to the rack, with the at least one seat including an assembling portion and an attached portion, with the assembling portion including a slot, with the rack slideably received in the slot along the axis, with the attached portion spaced from the assembling portion in a first direction perpendicular to the axis, with the attached portion including an abutted face and a recess, with the abutted face located opposite to the rack, with the recess located spaced from the slot and between the abutted face and the assembling portion, and with the recess receiving the magnet.

2. The tool holder as claimed in claim 1, with the rack including a rail, with the rail including a body and at least one hole formed on the body and extending in the first direction, with the assembling portion including a protrusion integrally formed and extending in the first direction into the slot and engaged into the at least one hole of the rail.

3. The tool holder as claimed in claim 2, with the assembling portion including a guiding face formed on an end of the protrusion inside the slot, with a tilted angle formed between the guiding face and the axis, and with the tilted angle being less than 10 degrees.

4. The tool holder as claimed in claim 2, with the rack including a plurality of clips, with each clip detachably mounted on the rail along the axis, with each clip including a head formed opposite to the rail, with the head of each clip having resiliency and being shaped and sized to be able to receive a socket.

5. The tool holder as claimed in claim 4, with the rail including a pair of wing portions extending sideways from the body, with each clip including a pair of wings extending sideways from the head, and with the pair of wings of each clip engaged with the pair of wing portions of the rail.

6. The tool holder as claimed in claim 5, with the rail made of one single piece from a metal sheet, and with each clip made of one single piece from a metal sheet.

7. The tool holder as claimed in claim 5, with the rail having a substantially U-shaped cross-section perpendicular to the axis, and with each clip having a substantially U-shaped cross-section perpendicular to the axis.

8. The tool holder as claimed in claim 1, with an extending direction of the recess parallel to the abutted face.

9. The tool holder as claimed in claim 1, with the recess having an opening disposed at a side of the attached portion and extending in a second direction perpendicular to the axis and the first direction and receiving the magnet in the second direction.

10. A seat accessory for a tool holder comprising:
a magnet;
an assembling portion including a slot extending along an axis, with the slot adapted to slideably receive the tool holder along the axis; and
an attached portion spaced from the assembling portion in a first direction perpendicular to the axis, with the attached portion including an abutted face and a recess, with the recess located spaced from the slot and between the abutted face and the assembling portion, and with the recess receiving the magnet.

11. The seat accessory for the tool holder as claimed in claim 10, with the assembling portion including a protrusion integrally formed and extending in the first direction into the slot and adapted to be engaged into the tool holder.

12. The seat accessory for the tool holder as claimed in claim 11, with the assembling portion including a guiding face formed on an end of the protrusion in the slot, with a tilted angle formed between the guiding face and the tool holder, and with the tilted angle being less than 10 degrees.

13. The seat accessory for the tool holder as claimed in claim 10, with an extending direction of the recess being parallel to abutted face.

14. The seat accessory as claimed in claim 10, with the recess having an opening disposed at a side of the attached portion and extending in a second direction perpendicular to the axis and the first direction and adapted to receive the magnet in the second direction.

15. A tool holder comprising:
a rack including a rail extending along an axis, with the rail including a body and at least one hole formed on the body; and
at least one seat connected to the rack, with the at least one seat including an assembling portion and an attached portion spaced from the assembling portion, with the assembling portion including a slot detachably engaged with the rack and a protrusion formed in the slot and engaged into the at least one hole of the rail, with the attached portion including an abutted face and a recess, with the abutted face located opposite to the rack, with the recess located between the abutted face and the assembling portion, and with the recess receiving a magnet.

\* \* \* \* \*